United States Patent
Satoh et al.

[11] Patent Number: 6,037,397
[45] Date of Patent: Mar. 14, 2000

[54] RUBBER MOLDED PRODUCT

[75] Inventors: Mikitoshi Satoh; Tsutomu Yamaguchi; Hiroaki Sawa; Kazuyoshi Ikeda; Masato Nishikawa, all of Omuta, Japan

[73] Assignee: Denki Kagaku Kogyo Kabushiki Kaisha, Tokyo, Japan

[21] Appl. No.: 09/104,387

[22] Filed: Jun. 25, 1998

[30] Foreign Application Priority Data

Nov. 27, 1997 [JP] Japan .................................. 9-325713

[51] Int. Cl.[7] ................ C08J 5/18; C08K 3/38; C08L 83/05; B29C 47/88
[52] U.S. Cl. ............ 524/404; 524/547; 524/588; 264/177.17; 264/211.12
[58] Field of Search .................... 524/404, 506, 524/547, 588; 264/920, 177.17, 211.12

[56] References Cited

U.S. PATENT DOCUMENTS

| | | | |
|---|---|---|---|
| 4,765,930 | 8/1988 | Mashimo et al. | 252/511 |
| 4,927,587 | 5/1990 | Takahshi et al. | 264/211 |
| 5,010,045 | 4/1991 | Maya | 501/96 |
| 5,201,916 | 4/1993 | Berg et al. | 51/293 |
| 5,679,457 | 10/1997 | Bergerson | 428/344 |
| 5,854,155 | 12/1998 | Kawasaki et al. | 501/96.4 |

OTHER PUBLICATIONS

Dean, John A.; Lange's Handbook of Chemistry 15th Ed., McGraw Hill New York (p. 10.63), 1999.

*Primary Examiner*—Vasu Jagannathan
*Assistant Examiner*—Caleie E. Shosho
*Attorney, Agent, or Firm*—Oblon, Spivak, McClelland, Maier & Neustadt, P.C.

[57] ABSTRACT

A rubber molded product containing an inorganic filler, in which the relation of an inorganic filler content and a thermal resistance is within the range enclosed by lines connecting points A (20,1.5), B (20,0.1) and C (50,0.1) in the X-Y coordinates wherein the X coordinate expresses the inorganic filler content (vol %) and the Y coordinate expresses the thermal resistance per 1 mm thickness (° C./W).

29 Claims, 2 Drawing Sheets

RUBBER MOLDED PRODUCT

BACKGROUND OF THE INVENTION

1. Field of the Invention

The present invention relates to a rubber molded product containing an inorganic filler.

Since the rubber molded product of the present invention is excellent in thermal conductivity and flexibility, it is suitable as a radiating electronic member used in contact with heat-generating electronic parts in order to remove heat generated from an electronic instrument having the heat-generating electronic parts such as a transistor, a thyristor and the like.

2. Description of the Prior Art

A heat-generating electronic part such as a transistor or a thyristor generates heat during its use, and it is important to remove such heat. Heretofore, as a method for removing the generated heat, it has been common to remove the heat by attaching the heat-generating electronic part to a radiating fin or a metal plate with an electrically insulating heat conductive (radiating) sheet interposed therebetween. As such a heat conductive sheet, a relatively hard radiation sheet having a heat conductive filler such as boron nitride powder dispersed in silicone rubber has been mainly employed.

Recently, circuits have been highly integrated year by year, and accordingly their heat-generating amounts have been increased. Thus, a radiating member having a thermal conductivity higher than heretofore, is demanded, but it is required to avoid application of strong pressure in order to prevent a heat-generating electronic part from being damaged. Such being the case, a sheet-like radiating member having a very small thermal resistance and a high flexibility is demanded.

In order to make a radiating sheet highly thermally conductive, it is proposed to load a large amount of a highly thermally conductive filler, but in such a method, there is a disadvantage that a flexibility of a radiating sheet is remarkably lost. Therefore, it is proposed to load boron nitride particles in the direction of sheet thickness in such a manner as "standing state" by utilizing an anisotropic property of thermal conductivity of boron nitride particles (i.e. specific property that thermal conductivity of scale-like particles of boron nitride is very large in the direction of length) (see, for example, JP-A-62-154410, JP-A-3-151658 and JP-A-8-244094).

However, in the production method of JP-A-62-154410, it is necessary to use a special device such as an ultrasonic shaker, and it is difficult to apply to a thick sheet. It is disclosed in this publication that a thermal resistance of a sheet containing 46 to 56 vol % of boron nitride is 0.40° C./W (sheet thickness: 0.45 mm) at minimum.

The production method of JP-A-3-151658 is a batchwise method, and accordingly a production cost is high. It is disclosed in this publication that a thermal resistance of a sheet containing 39 vol % of boron nitride or 56 vol % of boron nitride is 0.41° C./W (sheet thickness: 0.5 mm ) or 0.30° C./W (sheet thickness: 0.5 mm).

The production method of JP-A-8-244094 is an extrusion-molding method which can be continuously conducted, but a sheet thickness is controlled by the size of a mold outlet, and it is therefore hardly applicable to a sheet different in thickness. Moreover, a sheet produced by this method has boron nitride particles in the vicinities of upper and lower layers oriented in "laid state" along the sheet surface in respect to the thickness direction, and consequently a thermal conductivity is not satisfactorily raised. That is, it is disclosed in this publication that a thermal resistance of a sheet having a high boron nitride content of 50 vol % or 60 vol % is 0.20° C./W (sheet thickness: 0.3 mm) or 0.12° C./W (sheet thickness: 0.3 mm).

Since all of the above mentioned methods employ a large amount of expensive boron nitride powder, a cost of sheet produced therefrom becomes high, and a flexibility of a sheet becomes poor although it has a high thermal conductivity (low thermal resistance).

SUMMARY OF THE INVENTION

Under these circumstances, an object of the present invention is to provide a rubber molded product having a very high thermal conductivity and a satisfactory flexibility even by using only a small amount of an inorganic filler. Further, an object of the present invention is to provide a radiating electronic member (hereinafter referred to as "radiating spacer") having a high thermal conductivity and a high flexibility for externally removing heat generated in an electronic instrument, which does not damage a heat-generating electronic part even by pressing to make in contact thereto. Still further, an object of the present invention is to produce a sheet having scale-like particles of boron nitride or the like loaded in such a manner as "standing state" in the sheet thickness direction by extrusion-molding process at a high productivity, which can be conducted continuously at a low cost.

Thus, the essential features of the present invention are as follows:

1. A rubber molded product containing an inorganic filler, in which the relation of an inorganic filler content and a thermal resistance is within the range enclosed by lines connecting points A (20,1.5), B (20,0.1) and C (50,0.1) in the X-Y coordinates wherein the X coordinate expresses the inorganic filler content (vol %) and the Y coordinate expresses the thermal resistance per 1 mm thickness (° C./W).
2. The rubber molded product according to Claim 1, wherein the relation of an inorganic filler content (vol %) and a thermal resistance per 1 mm thickness (° C./W) is within the range enclosed by lines connecting points A (20,1.5), B (20,0.1) and C (45,0.1).
3. The rubber molded product according to Claim 1, which has a compression deformation rate of at least 30% under a load of 3 kg/cm².
4. The rubber molded product according to Claim 3, in which the relation of a compression deformation rate (%) and a thermal conductivity (W/mK) is within the range enclosed by lines connecting points a (30,11), b (30,4), c (80,0.5) and d (80,11) in the X-Y coordinates wherein the X coordinate expresses the compression deformation rate (%) and the Y coordinate expresses the thermal conductivity (W/mK).
5. The rubber molded product according to Claim 4, wherein the relation of a compression deformation rate (%) and a thermal conductivity (W/mK) is within the range enclosed by lines connecting points a (15,11), b (15,4), c (80,0.5) and d (80,11).
6. The rubber molded product according to Claim 1, herein the rubber is a solidified material of addition reaction type liquid silicone rubber and the inorganic filler is a powder containing boron nitride.
7. A radiating electronic member which comprises the rubber molded product of Claim 6.

8. A process for producing a rubber molded product containing an inorganic filler, which comprises cutting a plurality of belt-like molded products extruded from first cavity block-like molds (101) in the extrusion direction (i.e. vertical direction in respect to thickness direction of belt-like molded product), supplying the cut belt-like molded products to second cavity block-like molds (102) to be extrusion-molded, bundling a plurality of the belt-like molded products extruded from the second cavity block-like molds into one united body, and heat-curing the bundled body.

9. A process for producing a rubber molded product, which comprises passing a kneaded product containing an uncured rubber and an inorganic filler through a mold (1) having a plurality of first cavity block-like molds (101) and second cavity block-like molds (102) arranged so as to get cavity parts (13) of the first cavity block-like molds (101) faced to partition walls (12) of the second cavity block-like molds (102) with a space or without space, to obtain a plurality of belt-like sheets by extrusion-molding, bundling a plurality of the belt-like sheets thus extrusion-molded into one united body, and then heat-curing the united body.

10. A method for producing a rubber molded product, which comprises laminating a plurality of uncured rubber sheets containing an inorganic filler, curing the laminated sheet by vulcanization, and cutting the cured laminated sheet into a desired thickness in the laminating direction.

11. A method for producing a rubber molded product, which comprises laminating a plurality of uncured rubber sheets containing an inorganic filler, cutting the laminated sheet into a desired thickness in the laminating direction, and curing the cut laminated sheet by vulcanization.

12. The method according to Claim 8, wherein the rubber is an addition reaction type liquid silicone and the inorganic filler is a powder containing boron nitride.

BRIEF DESCRIPTION OF THE DRAWINGS

In the above FIGS. 1 to 3, 1 is a mold, 2 is a bundling mold, 3 is a cutter blade, 10 is a cavity block-like mold 11, is a box, 12 is a partition wall, 13 is a cavity part, 101 is a first cavity block-like mold, 102 is a second cavity block-like mold, w is a width of a cavity part, h is a height of a cavity part, p is a length of a cavity part and v is a distance (space) between a first cavity block-like mold and a second cavity block-like mold.

DETAILED DESCRIPTION OF THE INVENTION

Hereinafter, the present invention is further described in more details.

Suitable examples of an inorganic filler used in the present invention include highly thermally conductive inorganic powders such as aluminum oxide, magnesium oxide, boron nitride, aluminium nitride, silicon nitride, silicon carbide, mica, plate-like aluminum hydroxide, tetrapot type zinc oxide particles, and the like. Among them, boron nitride is most preferable since its thermal conductivity is extremely high in the length direction of its scale-like particle and a satisfactory rubber molded product having a high thermal conductivity can be obtained by making good use of such characteristics As boron nitride, a highly crystalline boron nitride having a graphite index (GI) of at most 1.5 by powdery X-ray analysis is particularly preferable.

In the present invention, it is possible to use a highly thermally conductive metal powder such as aluminum, copper or silver in combination with the above inorganic filler in such an amount as not to lose a satisfactory insulating property.

An inorganic filler content in the rubber molded product of the present invention is preferably from 20 to 45 vol %, more preferably from 25 to 40 vol %, to the total volume. If the inorganic filler content is less than 20 vol %, a satisfactory thermal conductivity can not be fully imparted to the rubber molded product an (effect of reducing thermal resistance is small), and if the inorganic filler content exceeds 45 vol %, the rubber molded product becomes poor in flexibility and mechanical strength.

Examples of a rubber used as a matrix for the rubber molded product of the present invention include silicone rubber, urethane rubber, acryl rubber, butyl rubber, ethylene-propylene copolymer, ethylene-vinyl acetate copolymer, and the like. Among them, a silicone rubber is most suitable since it imparts a satisfactory flexibility and shape-trailing property to a molded product and provides a satisfactory molded product having excellent heat resistance and adhesiveness to a heat-generating electronic part.

A typical example of a silicone rubber includes a peroxide-curing silicone rubber, but this is generally difficult in providing a desired flexibility, and in order to provide a satisfactorily high flexibility, an addition reaction type liquid silicone is suitable. Examples of the addition reaction type liquid silicone include a one component reaction type organopolysiloxane having both a vinyl group and a H-Si group in a molecule, and a two component type silicone comprising an organopolysiloxane having a vinyl group at the terminal or in a side chain and an organopolysiloxane having at least 2 H-Si group at the terminal or in a side chain. Commercially available products of the addition reaction type liquid silicone include "SE-1885A/B" tradename, manufactured by TORAY.DOW CORNING.SILICONE COMPANY).

Further, such an addition reaction type liquid silicone may be used in combination with a reaction retarder such as acetyl alcohols, maleic acid esters or the like, a thickening agent such as a silicone powder or aerosil having particle size of ten to several hundreds $\mu$m, a flame-retardant agent, a pigment and the like.

A rubber content in a rubber molded product of the present invention is preferably from 55 to 80 vol %, more preferably from 60 to 75 vol %, to the total volume. If the rubber content is less than 55 vol %, a rubber molded product obtained therefrom is poor in flexibility, and if the rubber content exceeds 80 vol %, a rubber molded product obtained therefrom does not have a satisfactorily low thermal resistance.

Thus, it is essential for an inorganic filler-containing rubber molded product of the present invention that the relation of an inorganic filler content vol %) and a thermal resistance (° C./W) per 1 mm thickness is within the range enclosed by lines connecting points A (20,1.5), B (20,0.1) and C (50,0.1), preferably points A (20,1.5), B (20,0.1) and C (45,0.1), in the X and Y coordinates wherein the X coordinate expresses the inorganic filler content vol % and the Y coordinate expresses the thermal resistance (° C./W) per 1 mm thickness.

In the left side zone of the line connecting points A and B, a rubber content is relatively high, and therefore it becomes difficult to reduce a thermal resistance and when using a rubber having a particularly high flexibility, an adhesiveness becomes too high to maintain a satisfactory shape. On the other hand, a rubber product in the right side zone of the line connecting points A and C is generally known heretofore, and a thermal resistance is not satisfactorily reduced a thermal conductivity is not improved) although an inorganic filler content is relatively high, and its production cost is high.

In the present invention, a thermal resistance is determined by placing a sample (1 mm) cut into TO-3 form between a copper plate and a heater case (effective area: 6.0 cm$^2$) made of TO-3 form copper having a transistor equipped therein, applying a load so as to compress an initial thickness by 10%, maintaining it for 4 minutes while applying a power of 5W to the transistor, measuring a temperature difference (° C.) between the heater case and a radiating fin and calculating in accordance with the following formula (1).

Thermal resistance (° C./W)=Temperature difference (° C.)/Power (W)  (1)

The flexibility of a rubber molded product of the present invention can be adjusted by controlling a curing degree of rubber and an inorganic filler content. The flexibility can be expressed by a compression deformation rate caused when applying a load of 3 kg/cm$^2$, and the compression deformation rate is preferably at least 15%, more preferably at least 30%. If the compression deformation rate is less than 15%, there is a fear of destroying a heat-generating electronic part because a load to be applied for fixing the rubber molded product to the heat-generating electronic part becomes too high.

Further, it is essential for a rubber molded product of the present invention that the relation of a compression deformation rate and a thermal conductivity is within the range enclosed by lines connecting points a (30,11), b (30,4), c (80,0.5) and d (80,11), preferably points a (15,11), b (15,4), c (80,0.5) and d (80,11), in the X-Y coordinates wherein the X coordinate expresses the compression deformation rate % and the Y coordinate expresses the thermal conductivity W/mK).

A rubber product in the lower zone of the line connecting points b and c is generally known heretofore, and a commercial product is in this zone and does not have satisfactory compression deformation rate and thermal conductivity. Further, a rubber product in the left zone of the line connecting points a and b does not have a satisfactory compression deformation rate, and when it is fixed to a heat-generating electronic part by applying pressure, it is liable to damage the heat-generating electronic part. Still further, a rubber product in the right zone of the line connecting points c and d does not have a satisfactory thermal conductivity.

The compression deformation rate is determined by applying a sample of 10 mm×10 mm×1 mm (thickness) to a tester for example, tradename "Autograph" manufactured by Shimazu Seisakusho K. K.) indicating a change under compression and a load applied, measuring a deformation change amount and an initial thickness of the sample when applying a load of 3 kg/cm$^2$ at a compression speed moving speed of head) of 0.5 cm/min and calculating in accordance with the following formula (2). When a sample thickness is less than 1 mm, samples are simply laminated to make a thickness of 1 mm, and when an area is smaller than 10 mm×10 mm, the total area of a plurality of samples is made 100 mm$^2$, thereby measuring a compression deformation rate.

Compression deformation rate (%)=Deformation amount (mm) under load of 3 kg/cm$^2$×100/Initial thickness of sample (mm)(2)

Also, a thermal conductivity can be calculated in accordance with the following formula (3) by substituting a thermal resistance (° C./W) calculated from the above formula (1) for the following formula (3).

Thermal conductivity (W/mK)={Sample thickness (m)}/{Thermal resistance (° C./W)×Sample area (m$^2$)}  (3)

The rubber molded product of the present invention has a thickness of from 0.2 to 10 mm, preferably from 0.5 to 2 mm, and its plane shape is not specially limited.

If necessary, the rubber molded product of the present invention can be subjected to surface treatment in order to control an adhesion of its surface. Examples of the surface treatment method include a method of grinding with boron nitride powder, a method of coating the surface with a crosslinking agent such as peroxide and curing the surface only, and a method of irradiating with ultraviolet ray.

Further, since the rubber molded product of the present invention has a high flexibility and a little adhesiveness, it is preferable to cover it with a wrapping material in order to make its handling easy during transporting and storing or to prevent the product from being attached with dusts.

Examples of the packing material include polyethylene film, polypropylene film, PET film, Teflon film, glass cloth-reinforced Teflon film, and the like.

One example of the use of the rubber molded product of the present invention is a radiating spacer. The radiating spacer is used by being place between a cooling device and a heat-generating electronic part or a circuit substrate having a heat-generating electronic part equipped therein, and it can also be attached to a cooling device and integrated to provide a heat-radiating member for an electronic part.

Examples of the cooling device include a heat sink, a radiating fin, a metallic or ceramics case and the like, and examples of the ceramics include AlN, BN, SiC, Al$_2$O$_3$ and the like. Also, examples of an electronic equipment using the above heat-radiating members for electronic parts include a computer, a CD-ROM drive, a DVD drive, a CD-R drive or the like.

Hereinafter, some methods of producing a rubber molded product of the present invention are described below.

Examples of the first production method include a method comprising mixing an uncured rubber and an inorganic filler at room temperature, extruding the mixture through a piston type or screw type extruder to form a green sheet, preparing a laminate of green sheets, heat-curing the laminate and cutting the cured laminate into a desired width thickness) in the laminating direction; a method comprising vulcanization-curing after cutting the above green sheet laminate into a desired width (thickness) in the laminating direction; or a method comprising placing the above mixture of an uncured rubber and an inorganic filler in a mold having a tunnel section having a depth/width ratio of at least 1/200, pressing and heating the mixture by a press machine to form a green sheet, taking the green sheet out of the mold to prepare a laminate, heat-curing the laminate and cutting the cured laminate into a desired width (thickness) in the laminating direction.

Further, the second production method is explained with reference to the drawings.

Figure 1:
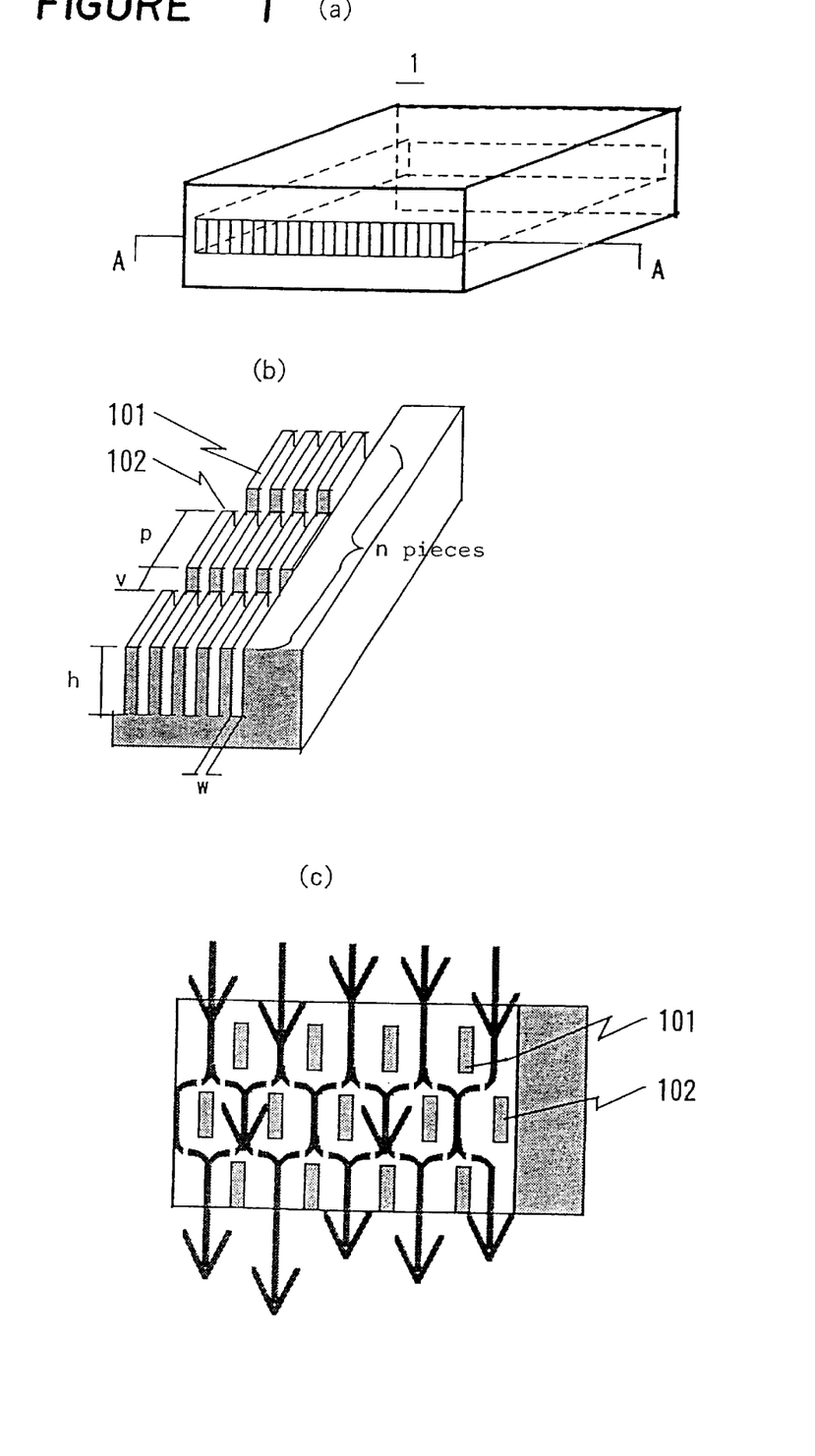
FIG. 1 illustrates an example of a mold used for producing a rubber molded product of the present invention, wherein (a) is a perspective view, (b) is a fragmentary partially enlarged internal perspective view in the A—A section, and (c) is a top view of the above FIG. 1(b).

A mold (1) used in this process has a plurality n pieces) of cavity block-like molds (10) (illustrated in FIG. 3) arranged as illustrated in FIG. 1. Thus, cavity parts (13) of the first cavity block-like molds (101) are disposed in such a manner as to face to partition walls (12) of the second cavity block-like molds (102), thereby arranging a plurality of rows. In such a case, the first cavity block-like molds and the second cavity block-like molds may be disposed with a space (v) or without a space (v), but it is preferable to dispose them with a space of from 0.5 to 2 mm.

Figure 3:
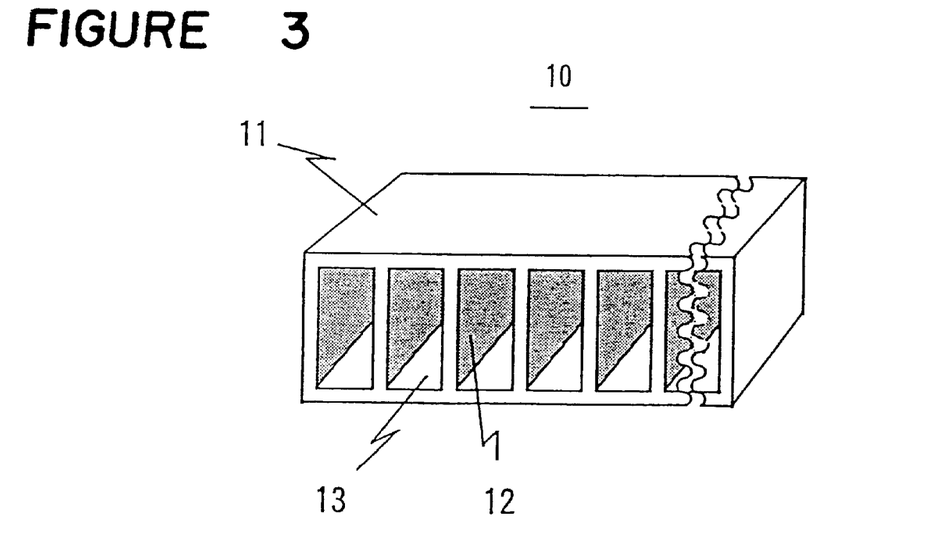
FIG. 3 is a fragmentary perspective view illustrating an example of a cavity block-like mold used for producing a rubber molded product of the present invention.

Cavity parts (13) of cavity block-like molds (10) are formed by providing partition walls (12) in the inside of a box (11) in the longitudinal direction, and cavity part (13) has preferably a shape having a width (w) of from 0.1 to 2 mm and a height (h)/width (w) ratio (h/w) of at least 2.0, more preferably at least 10. However, the shape is not necessarily limited to a rectangular shape but may be an oval shape. If the above h/w ratio is less than 2.0, it becomes difficult to load particles having a high aspect ratio e.g. scale-like particles of boron nitride) in such a manner as to be "standing state", and therefore an effect for reducing a thermal resistance of a rubber molded product becomes unsatisfactory. An example of the size of the cavity part comprises a height of 3.0 mm, a width of 0.25 mm and h/w=12. Also, the length (p) of the cavity part is generally from 0.5 to 5 mm, preferably from 1 to 2 mm.

The number of cavity parts is preferably at least 100 although it depends on the width of a rubber molded product.

The end shape of partition walls (12) is preferably such an acute angle as to easily divide belt-like molded products extruded from the first cavity block-like molds in the extruding direction i.e. the perpendicular direction in respect to the thickness direction of belt-like molded products and also to easily supply them.

Kneaded starting materials supplied to the above mold (1) are supplied along the arrow direction as illustrated in FIG. 1(c), and are firstly formed into a plurality of belt-like molded products by the first cavity block-like molds. Thereafter, the belt-like molded products thus formed run against partition walls of the second cavity block-like molds and are divided in the extrusion direction, and are supplied into cavity parts of the second cavity block-like molds to be extrusion-molded again, thereby providing a plurality of belt-like sheets. By passing through these steps, a proportion of particles having a high aspect ratio disposed in such a manner as "standing state" is increased. The number (n) of cavity block-like molds is preferably from 2 to 10.

Figure 2:
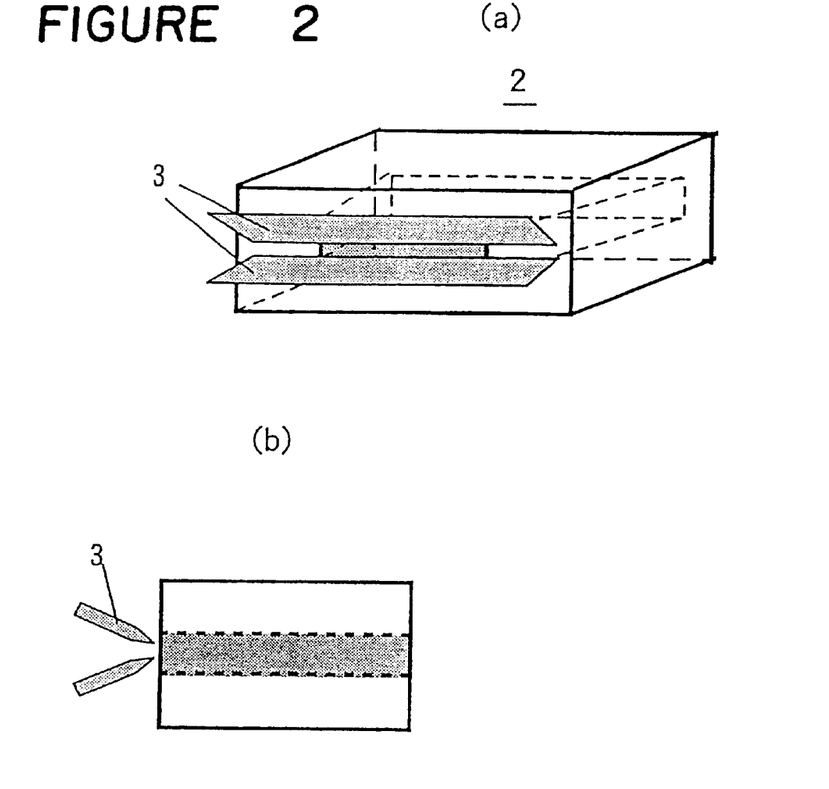
FIG. 2 illustrates an example of a bundling mold used for producing a rubber molded product of the present invention, wherein (a) is perspective view and (b) is a side view.

A plurality of the belt-like sheets thus formed are then supplied to a bundling mold (2) as illustrated in FIG. 2, and are bundled and integrated, followed by heat-curing to form a rubber molded product sheet.

In this production method, it is preferable to provide a cutter blade (3) at the outlet of the bundling mold and to remove the upper layer part and/or the lower layer part of the bundled and integrated product, thereby removing the upper and lower layer parts in which a proportion of particles having a high aspect ratio disposed in "standing state" is small as compared with the inside part of the bundled and integrated product. The removed upper and lower layer parts are recycled for use as a starting mixture.

The thickness of a rubber molded product can be easily adjusted by controlling the distance between cutter blades or width of the bundling mold. When the rubber molded product is used as a radiating spacer, its thickness is adjusted to from 0.2 to 10 mm, preferably from 0.5 to 2.0 mm. A radiating spacer can be produced by punching the rubber molded product sheet into a desired shape.

EXAMPLES

The present invention is further illustrated with reference to the following Examples and Comparative Examples.

EXAMPLES 1 TO 3

A component and B component of a two component addition reaction type silicone comprising A component (organopolysiloxane having a vinyl group) and B component (organopolysiloxane having a H-Si group) (tradename "SE-1885" manufactured by TORAY.DOW CORNING COMPANY) were mixed in such ratios (vol %) as shown in the following Table 1, and to the resultant mixture, were added a reaction retarder containing dimethyl maleate as the main component and boron nitride powder (tradename "Denka Boron Nitride SGP" having an average particle size of 20 $\mu$m, manufactured by Denki Kagaku Kogyo K. K.) in such mixing ratios (vol %) as shown in the following Table 1 at room temperature to prepare each slurry.

The slurry thus prepared was cast on the central part of a mold (11 cm×11 cm×1.0 mm depth) having a concave section shape, and the mold was covered with a flat plate, and was heat-pressed at 150° C. for 10 minutes under a pressure to obtain a green sheet having a thickness of 1.0 mm.

50 sheets of the green sheets thus obtained were laminated, and were heat-cured at 150° C. for 22 hours in an oven. The laminated solidified product thus obtained was cut by a cutter in the laminating direction at a width of 1.0 mm to produce a sheet-like rubber molded product (thickness: 1 mm) of the present invention.

Comparative Examples 1 to 3

Each green sheet obtained in Examples 1 to 3 was heated at 150° C. for 22 hours in an oven without laminating green sheets to obtain a green sheet-solidified product having a thickness of 1.0 mm.

The above obtained sheet-like rubber molded products of Examples 1 to 3 and the green sheet-solidified products of Comparative Examples 1 to 3 were measured with respect to a thermal resistance and a compression deformation rate as mentioned above, and the results are shown in the following Table 1.

TABLE 1

|  | Examples | | | Comparative Examples | | |
| --- | --- | --- | --- | --- | --- | --- |
|  | 1 | 2 | 3 | 1 | 2 | 3 |
| Component composition: vol % | | | | | | |
| Reactive silicone A component | 39 | 36 | 33 | 39 | 36 | 33 |
| Reactive silicone B | 31 | 29 | 27 | 31 | 29 | 27 |

TABLE 1-continued

|  | Examples | | | Comparative Examples | | |
| --- | --- | --- | --- | --- | --- | --- |
|  | 1 | 2 | 3 | 1 | 2 | 3 |
| component | | | | | | |
| Boron nitride powder | 30 | 35 | 40 | 30 | 35 | 40 |
| Reaction retarder | 0.018 | 0.016 | 0.015 | 0.018 | 0.016 | 0.015 |
| Sample thickness (mm) | 1.0 | 1.0 | 1.0 | 1.0 | 1.0 | 1.0 |
| Thermal resistance (° C./W) | 0.87 | 0.48 | 0.36 | 2.04 | 2.01 | 1.58 |
| Compression deformation rate (%) | 64 | 54 | 38 | 56 | 48 | 34 |
| Thermal conductivity (W/mK) | 1.7 | 3.1 | 4.2 | 0.7 | 0.8 | 1.0 |

EXAMPLE 4

A reaction retarder containing dimethyl maleate as the main component and a boron nitride powder (tradename "Denka Boron Nitride GP" having an average particle size of 7 μm, manufactured by Denki Kagaku Kogyo K. K.) were mixed with the same silicone as used in Example 1 at room temperature in such a ratio (vol %) as shown in the following Table 2 to prepare a slurry.

The slurry thus prepared was loaded into a cylinder structure mold having a die with a slit (0.3 mm×35 mm) fixed, and was extruded through the slit under a pressure by a piston to obtain a green sheet.

A plurality of green sheets were laminated to a height of 50 mm, and were heat-cured at 150° C. for 22 hours in an oven to obtain a laminated solidified product, which was then cut in the laminating direction by a cutter to produce a sheet-like rubber molded product (thickness: 1.1 mm) of the present invention.

EXAMPLE 5

A sheet-like rubber molded product (thickness: 1.1 mm) was produced in the same manner as in Example 4, except that a die with a slit of 1.0 mm×35 mm was used.

The sheet-like rubber molded products thus produced were measured with respect to a thermal resistance, a compression deformation rate and a thermal conductivity as mentioned above, and the results are shown in the following Table 2.

TABLE 2

|  | Examples | |
| --- | --- | --- |
|  | 4 | 5 |
| Component composition: vol % | | |
| Reactive silicone A component | 33 | 33 |
| Reactive silicone B component | 27 | 27 |

TABLE 2-continued

|  | Examples | |
| --- | --- | --- |
|  | 4 | 5 |
| Boron nitride powder | 40 | 40 |
| Reaction retarder | 0.015 | 0.015 |
| Thickness of green sheets (mm) | 0.4 | 1.1 |
| Sample thickness (mm) | 1.1 | 1.1 |
| Thermal resistance (° C./W) | 0.30 | 0.29 |
| Compression deformation rate (%) | 37 | 37 |
| Thermal conductivity (W/mK) | 5.6 | 5.7 |

EXAMPLES 6 AND 7

The same silicone, reaction retarder and boron nitride powder (average particle size=7 μm) as used in Example 4 were mixed at room temperature at such ratios (vol %) as shown in the following Table 3 to prepare a slurry.

The slurry thus prepared was supplied into an extruder equipped with a mold (1) of FIG. 1 having three pieces of cavity block-like molds with cavity parts of FIG. 3 arranged at a space (v) of 1 mm, and was extrusion-molded into a plurality of belt-like sheets. The belt-like sheets thus extrusion-molded were supplied into a bundling mold of FIG. 2 to be bundled and integrated, and the bundled and integrated product thus obtained was extruded through between two fixed cutter blades (3) to obtain a green sheet (thickness: 1 mm), the upper and lower layers of which were removed. The upper and lower layers thus removed were recycled for use.

The green sheet thus obtained was heat-cured at 150° C. for 22 hours in an oven to produce a sheet-like rubber molded product (thickness: 1 mm).

EXAMPLES 8 TO 10

A sheet-like rubber molded product (thickness: 1 mm) was produced in the same manner as in Example 6, except that the two component addition reaction type silicone was replaced by tradename "CY52-283A/B" manufactured by TORAY.DOW CORNING COMPANY and A component and B component were mixed in such mixing ratios as shown in the following Table 3.

Comparative Examples 4 and 5

A sheet-like rubber molded product (thickness: 1 mm) was produced in the same manner as in Example 6 or Example 8, except that the mold (1) was replaced by a usual extrusion mold for a belt-like sheet (having a rectangular opening with a thickness of 1 mm and a width of 50 mm) to produce a green sheet having a thickness of 1 mm, which was then cured.

EXAMPLES 11 AND 12

A sheet-like rubber molded product (thickness: 1 mm) was produced in the same manner as in Example 6, except that a starting kneaded rubber compound for extrusion molding was prepared by mixing a peroxide-curing silicone rubber (tradename "TSE2913U" manufactured by Toshiba Silicone K. K.), a boron nitride powder (tradename "Denka Boron Nitride GP" having an average particle size of 7 μm, manufactured by Denki Kagaku Kogyo K. K.) and a vulcanizer (2,4-dichlorobenzoylperoxide) at room temperature in such ratios (vol %) as shown in the following Table 4.

Comparative Examples 6 and 7

A sheet-like rubber molded product (thickness: 1 mm) was produced in the same manner as in Example 11 or Example 12, except that the mold (1) was replaced by a usual extrusion mold for a belt-like sheet (having a rectangular opening with a height of 1 mm and a width of 50 mm) to produce a green sheet having a thickness of 1 mm, which was then cured.

The above obtained sheet-like rubber molded products were measured with respect to a thermal resistance, a compression deformation rate and a thermal conductivity as mentioned above, and the results are shown in the following Tables 3 and 4.

TABLE 3

| | | Ex. 6 | Ex. 7 | Ex. 8 | Ex. 9 | Ex. 10 | Comp. Ex. 4 | Comp. Ex. 5 |
|---|---|---|---|---|---|---|---|---|
| Component composition: vol % | | | | | | | | |
| SE1885FR A component | | 33 | 33 | — | — | — | 33 | — |
| SE1885FR B component | | 27 | 27 | — | — | — | 27 | — |
| CY52-283 A component | | — | — | 32 | 32 | 32 | — | 32 |
| CY52-283 B component | | — | — | 26 | 26 | 26 | — | 26 |
| Boron nitride powder | | 40 | 40 | 42 | 42 | 42 | 40 | 42 |
| Reaction retarder | | 0.015 | 0.015 | 0.003 | 0.003 | 0.003 | 0.015 | 0.003 |
| Cavity part | Width (w) (mm) | 0.25 | 0.20 | 0.30 | 0.25 | 0.20 | 50 | 50 |
| | Height (h) (mm) | 3 | 3 | 3 | 3 | 3 | 1 | 1 |
| | h/w | 12 | 15 | 10 | 12 | 15 | 0.02 | 0.02 |
| | Length (p) (mm) | 2.0 | 2.0 | 1.0 | 2.0 | 2.0 | 6 | 6 |
| | Number | 160 | 160 | 160 | 300 | 160 | 1 | 1 |
| Distance between molds v (mm) | | 1.0 | 1.0 | 1.0 | 1.0 | 1.0 | — | — |
| Cavity block-like mold number n | | 3 | 3 | 2 | 3 | 3 | 1 | 1 |
| Sample thickness (mm) | | 1.0 | 1.0 | 1.0 | 1.0 | 1.0 | 1.0 | 1.0 |
| Thermal resistance (° C./W) | | 0.42 | 0.41 | 0.38 | 0.39 | 0.36 | 1.15 | 1.25 |
| Compression deformation rate (%) | | 37 | 36 | 22 | 25 | 24 | 34 | 30 |
| Thermal conductivity (W/mK) | | 3.6 | 3.7 | 3.9 | 3.8 | 4.2 | 1.3 | 1.2 |

TABLE 4

| | | Ex. 11 | Ex. 12 | Comp. Ex. 6 | Comp. Ex. 7 |
|---|---|---|---|---|---|
| Component composition: vol % | | | | | |
| Peroxide-curing silicone rubber | | 68 | 56 | 68 | 56 |
| Boron nitride powder | | 30 | 42 | 30 | 42 |
| Vulcanizer | | 2 | 2 | 2 | 2 |
| Cavity part | Width (w) (mm) | 0.25 | 0.25 | 50 | 50 |
| | Height (h) (mm) | 3 | 1 | 1 | |
| | h/w | 12 | 12 | 0.02 | 0.02 |
| | Length (p) (mm) | 2.0 | 2.0 | 6 | 6 |
| | Number | 160 | 300 | 1 | 1 |
| Distance between molds v (min) | | 1.0 | 1.0 | — | — |
| Cavity block-like mold number n | | 3 | 3 | 1 | 1 |

TABLE 4-continued

|  | Ex. 11 | Ex. 12 | Comp. Ex. 6 | Comp. Ex. 7 |
|---|---|---|---|---|
| Sample thickness (mm) | 1.0 | 1.0 | 1.0 | 1.0 |
| Thermal resistance (° C./w) | 0.58 | 0.35 | 2.04 | 1.24 |
| Compression deformation rate (%) | 20 | 18 | 20 | 18 |
| Thermal conductivity (W/mK) | 2.6 | 4.3 | 0.7 | 1.2 |

Thereafter, a heat sink was produced by preparing a radiating spacer (50 mm×50 mm×1 mm) by punching each sheet-like rubber molded product obtained in the above Examples 1 to 12 and laminating the radiating spacer on a flat plate surface of a radiating fin made of aluminum. As this result, the radiating spacer was adhesive to the aluminum plate surface and was easily adhered to the aluminum plate. The heat sink thus obtained was applied to a heat-generating electronic part under a load of 3 kg/cm², but the heat-generating electronic part was not damaged, and heat was quite satisfactorily radiated during operation.

What is claimed is:

1. A rubber molded product containing an inorganic filler, in which the relation of an inorganic filler content and a thermal resistance is within the range enclosed by lines connecting points A (20,1.5), B (20,0.1) and C (50,0.1) in the X-Y coordinates wherein the X coordinate expresses the inorganic filler content (vol %) and the Y coordinate expresses the thermal resistance per 1 mm thickness (° C./W).

2. The rubber molded product according to claim 1, wherein the relation of an inorganic filler content (vol %) and a thermal resistance per 1 mm thickness (° C./W) is within the range enclosed by lines connecting points A (20,1.5), B (20,0.1) and C (45,0.1).

3. The rubber molded product according to claim 1, which has a compression deformation rate of at least 30% under a load of 3 kg/cm².

4. The rubber molded product according to claim 3, in which the relation of a compression deformation rate (%) and a thermal conductivity (W/mK) is within the range enclosed by lines connecting points a (30,11), b (30,4), c (80,0.5) and d (80,11) in the X-Y coordinates wherein the X coordinate expresses the compression deformation rate (%) and the Y coordinate expresses the thermal conductivity (W/mK).

5. The rubber molded product according to claim 4, wherein the relation of a compression deformation rate (%) and a thermal conductivity (W/mK) is within the range enclosed by lines connecting points a (15,11), b (15,4), c (80,0.5) and d (80,11).

6. The rubber molded product according to claim 4, wherein the rubber is a solidified material of addition reaction type liquid silicone rubber and the inorganic filler is a powder containing boron nitride.

7. A radiating electronic member which comprises the rubber molded product of claim 6.

8. The rubber molded product according to claim 1, wherein the rubber is a solidified material of addition reaction type liquid silicone rubber and the inorganic filler is a powder containing boron nitride.

9. A radiating electronic member which comprises the rubber molded product of claim 8.

10. A process for producing a rubber molded product containing an inorganic filler, which comprises cutting a plurality of belt-like molded products extruded from first cavity block-like molds (101) in the extrusion direction, supplying the cut belt-like molded products to second cavity block-like molds (102) to be extrusion-molded, bundling a plurality of the belt-like molded products extruded from the second cavity block-like molds into one united body, and heat-curing the bundled body.

11. A process for producing a rubber molded product according to claim 10, which comprises passing a kneaded product containing an uncured rubber and an inorganic filler through a mold (1) having a plurality of first cavity block-like molds (101) and second cavity block-like molds (102) arranged so as to get cavity parts (13) of the first cavity block-like molds (101) faced to partition walls (12) of the second cavity block-like molds (102) with a space or without a space, to obtain a plurality of belt-like sheets by extrusion-molding, bundling a plurality of the belt-like sheets thus extrusion-molded into one united body, and then heat-curing the united body.

12. The process according to claim 11, wherein the space (v) between the first cavity block-like molds (101) and the second cavity block-like molds (102) is from 0.5 to 2 mm.

13. The process according to claim 11, wherein the cavity parts (13) have a shape having a height (h)/width (w) ratio (h/w) of at least 2.0.

14. The process according to claim 11, wherein the cavity parts (13) have a shape having a height (h)/width (w) ratio (h/w) of at least 10.

15. The process according to claim 11, wherein the number of the cavity parts is at least 100.

16. The method according to claim 10, wherein the rubber is an addition reaction type liquid silicone and the inorganic filler is a powder containing boron nitride.

17. A method for producing a rubber molded product, which comprises laminating a plurality of uncured rubber sheets containing an inorganic filler, curing the laminated sheet by vulcanization, and cutting the cured laminated sheet into a desired thickness in the laminating direction.

18. The method according to claim 17, wherein the rubber is an addition reaction type liquid silicone and the inorganic filler is a powder containing boron nitride.

19. A method for producing a rubber molded product, which comprises laminating a plurality of uncured rubber sheets containing an inorganic filler, cutting the laminated sheet into a desired thickness in the laminating direction, and curing the cut laminated sheet by vulcanization.

20. The method according to claim 19, wherein the rubber is an addition reaction type liquid silicone and the inorganic filler is a powder containing boron nitride.

21. A rubber molded product containing an inorganic filler, in which the relation of an inorganic filler content and a thermal resistance is within the range enclosed by lines connecting points A (20,1.5), B (20,0.1) and C (50,0.1) in the X-Y coordinates wherein the X coordinate expresses the inorganic filler content (vol %) and the Y coordinate expresses the thermal resistance per 1 mm thickness (° C./W), wherein said product is made by either (1) a process which comprises cutting a plurality of belt-like molded products extruded from first cavity block-like molds (101) in the extrusion direction, supplying the cut belt-like molded products to second cavity block-like molds (102) to be extrusion-molded, bundling a plurality of the belt-like molded products extruded from the second cavity block-like molds into one united body, and heat-curing the bundled body, or (2) a process which comprises laminating a plurality of uncured rubber sheets containing an inorganic filler, curing the laminated sheet by vulcanization, and cutting the cured laminated sheet into a desired thickness in the laminating direction, or (3) a process which comprises laminating a plurality of uncured rubber sheets containing an inorganic filler, cutting the laminated sheet into a desired thickness in the laminating direction, and curing the cut laminated sheet by vulcanization.

22. The rubber molded product according to claim 21, wherein the relation of an inorganic filler content (vol %) and a thermal resistance per 1 mm thickness (° C./W) is within the range enclosed by lines connecting points A (20,1.5), B (20,0.1) and C (45,0.1).

23. The rubber molded product according to claim 21, which has a compression deformation rate of at least 30% under a load of 3 kg/cm².

24. The rubber molded product according to claim 23, in which the relation of a compression deformation rate (%) and a thermal conductivity (W/mK) is within the range enclosed by lines connecting points a (30,11), b (30,4), c (80,0.5) and d (80,11) in the X-Y coordinates wherein the X coordinate expresses the compression deformation rate (%) and the Y coordinate expresses the thermal conductivity (W/mK).

25. The rubber molded product according to claim 24, wherein the relation of a compression deformation rate (%) and a thermal conductivity (W/mK) is within the range enclosed by lines connecting points a (15,11), b (15,4), c (80,0.5) and d (80,11).

26. The rubber molded product according to claim 24, wherein the rubber is a solidified material of addition reaction type liquid silicone rubber and the inorganic filler is a powder containing boron nitride.

27. A radiating electronic member which comprises the rubber molded product of claim 26.

28. The rubber molded product according to claim 21, wherein the rubber is a solidified material of addition reaction type liquid silicone rubber and the inorganic filler is a powder containing boron nitride.

29. A radiating electronic member which comprises the rubber molded product of claim 28.

* * * * *